United States Patent
Ruff et al.

(10) Patent No.: US 8,073,499 B2
(45) Date of Patent: *Dec. 6, 2011

(54) BATTERY-LESS ELECTRONIC DEVICE

(75) Inventors: Alan L. Ruff, Poplar Grove, IL (US); Matthew M. Nakanishi, Libertyville, IL (US); Mark Carlson, Round Lake, IL (US); Robert M. Johnson, Lake Zurich, IL (US); Mark R. Braun, Elgin, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 986 days.

This patent is subject to a terminal disclaimer.

(21) Appl. No.: 12/019,944

(22) Filed: Jan. 25, 2008

(65) Prior Publication Data

US 2008/0119159 A1 May 22, 2008

Related U.S. Application Data

(63) Continuation of application No. 11/098,488, filed on Apr. 4, 2005, now Pat. No. 7,343,147.

(51) Int. Cl.
*H04B 1/38* (2006.01)

(52) U.S. Cl. .... 455/573; 455/572; 455/557; 361/679.81

(58) Field of Classification Search .................. 455/573, 455/572, 557; 361/686, 679.81
See application file for complete search history.

(56) References Cited

U.S. PATENT DOCUMENTS

| 5,892,756 | A | * | 4/1999 | Murphy | 370/241 |
| 5,903,850 | A | * | 5/1999 | Huttunen et al. | 455/557 |
| 6,469,891 | B1 | * | 10/2002 | Takita et al. | 361/679.4 |
| 6,587,152 | B1 | * | 7/2003 | Sharp et al. | 348/373 |

* cited by examiner

*Primary Examiner* — Danh Le
(74) *Attorney, Agent, or Firm* — Yudell Isidore Ng Russell PLLC

(57) ABSTRACT

Automated software loading into a battery-less mobile phone is accomplished through attachment of a special non-standard USB On-The-Go cable to a serial connector of the mobile phone, thereby delivering power supply and unique signals for placing the phone in a special mode of operation used for production or distribution. In operation, when a unique non-standard voltage is asserted on the identification (ID) pin of the USB connector interface, it is detected by special circuitry in the serial connector. The circuitry then enables power supply to the battery-less phone and generates a turn-on signal directing the mobile phone to automatically power-on and enter into a particular state of operation, for example a test or software loading mode. Because this process is automatic, the efficiency of software loading or testing during production or distribution of the mobile device is improved.

13 Claims, 3 Drawing Sheets

BATTERY-LESS ELECTRONIC DEVICE

PRIORITY CLAIM

The present application is a continuation of and claims priority from U.S. patent application Ser. No. 11/098,488, filed on Apr. 4, 2005 now U.S. Pat. No. 7,343,147 and entitled, "A Method And Apparatus For Powering And Loading Software Into A Battery-Less Electronic Device," the contents of which is incorporated herein by reference.

BACKGROUND OF THE INVENTION

1. Field of the Invention

The present invention relates generally to placing electronic devices into a special mode of operation during production or distribution. More particularly, the present invention relates to testing or loading software in a battery-powered electronic device such as a mobile wireless communication device during production or distribution, particularly prior to the device being attached to a battery.

2. Description of the Related Art

Modern electronic devices such as mobile wireless phones, portable digital assistants, digital cameras, portable storage devices, audio players and portable gaming devices often include sophisticated processing elements and memory devices for executing and storing software and data. For example, wireless mobile communication devices such as cellular phones often contain flash memory, processors and digital signal processors (DSPs) to implement their wireless communication functionality. During production, software for instructing these elements must be loaded into the electronic devices. It is also sometimes necessary to reload or update software to correct errors or provide additional features on the devices.

To permit software loading, the electronic device's communication ports, processing elements and memory devices must be powered and placed in a special mode of operation to actuate the load process. However, a battery is commonly not attached to the device at the stage of production or distribution when software loading must occur. As a consequence, current production methodologies rely on a time-consuming manual process of attaching a battery pack to the device, manually actuating a power-on button sequence to bring the device into operation in a special programming mode, and connecting the device to a personal computer (PC) or other production equipment to permit the software download.

As will be appreciated, it is not desirable to require a manual power-on process or to install a battery for the short time required to load software in a mass production environment. What is needed is a method and apparatus that provides battery-less power and automatic power-on of an electronic device during mass production software downloading.

BRIEF DESCRIPTION OF THE DRAWINGS

This invention is described in a preferred embodiment in the following description with reference to the drawings, in which like numbers represent the same or similar elements, as follows.

Figure 1:
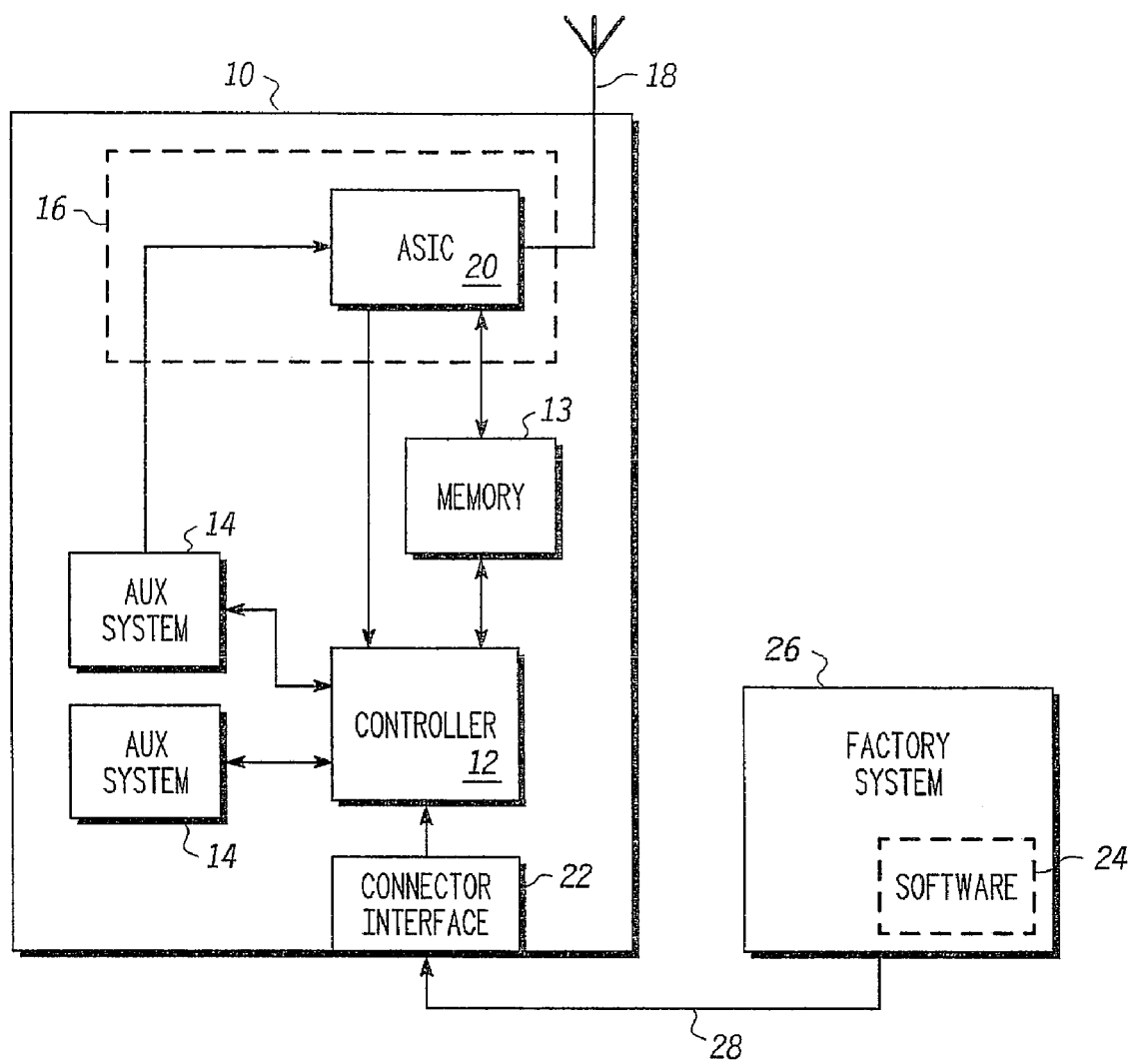
FIG. 1 is a block diagram of a mobile wireless communication device in communication with a factory system for downloading software to the device, in accordance with a preferred embodiment of the present invention.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

A preferred embodiment of the present invention provides a method and apparatus for automated software loading into a battery-less electronic device such as a mobile phone, portable digital assistant, MP3 player, portable radio, or portable game, for example, through attachment of a serial cable to the device. The non-standard serial cable connects to a serial connector of the device to provide power supply and unique signals for placing the electronic device in a particular mode of operation. The serial cable is effective to place the device in a mode necessary for loading software. In operation, a unique, non-standard signal transmitted over an identification (ID) pin of the serial bus triggers a turn-on circuit to signal the electronic device to automatically power-on and enter into the upload mode. One preferred electronic device of the present invention comprises a serial bus interface for providing serial communications to the electronic device via a connected serial cable having an identification pin and a power pin. The electronic device further comprises a turn-on circuit electrically coupled to the identification pin and a power pin of the serial bus interface, wherein, in response to a non-standard signal received on the identification pin, the turn-on circuit: (1) generates a turn-on signal for the electronic device, and (2) enables power to be supplied to the electronic device from the power pin. While a preferred embodiment describes automatically placing a battery-less wireless communication device such as a cellular phone in a production mode of operation, it will be appreciated by those skilled in the art that the method and apparatus of the present invention applies equally to other electronic devices and other modes of operation.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices such as portable digital assistants, digital cameras, portable storage devices, audio players and portable gaming devices, for example.

With reference now to the figures, and in particular with reference to FIG. 1, there is shown a block diagram of a mobile wireless communication device in communication with a factory system for downloading software to the device, in accordance with a preferred embodiment of the present invention. In general, wireless communication device 10 typically includes a controller 12, various auxiliary systems 14, a transceiver 16 and an antenna 18, which work in manner well known in the art. The transceiver 16 typically includes one or more ASIC integrated circuit chips 20 for controlling various transmit and/or receive signal characteristics, such as power level, modulation, etc. These ASIC integrated circuit chips 20 also typically translate signals between an intermediate frequency used internal to the phone 10 and a radio frequency used for transmission over antenna 18.

During production of the wireless mobile communication device 10, software 24 (which may include both instructions and data) is downloaded from a factory system 26 (for example, a PC) via cable 28 to various memory devices (memory 13) in wireless mobile communication device 10. Cable 28 is a serial bus cable electrically connected to a connector interface 22 providing data communication between factory system 26 and wireless communication device 10. Software 24 is executed or otherwise utilized in various capacities within controller 12, auxiliary systems 14 and ASIC 20 to implement wireless communication functionality and other phone operations.

In a preferred embodiment of the present invention, wireless communication device 10 and factory system 26 each utilize a hardware bus interface conforming to the Universal Serial Bus (USB) protocol. USB Specification 1.1 is designed to connect peripherals such as a keyboard, mouse, joy stick, scanner, printer and various telephony devices to a PC or other host device. Full-speed USB devices use the maximum bandwidth of 12 Megabits per second (Mbps) with up to 127 devices attached, while low-speed devices can transfer data using a 1.5 Mbps sub-channel. Revision 2.0 of the USB specification added a high-speed mode with an increased bandwidth of 480 Mbps.

In addition to increased bandwidth, USB 2.0 introduced new functionality called USB On-The-Go (OTG). USB OTG supports point-to-point connectivity to permit a single connection between two devices in an ad-hoc mode. Devices capable of operating as either host or peripheral are called Dual-role. Dual-role devices use a new USB cable receptacle called the mini-AB connector, which mates with a USB OTG cable. In OTG nomenclature, the initial host device is called the "A-Device" and the initial peripheral device is called the "B-Device." The orientation of the USB OTG cable interconnecting the two devices determines these initial roles. The USB OTG cable has a mini-A plug on one end, which identifies the initial A-Device, and a mini-B plug on the other end, which identifies the initial B-Device. Thereafter, host negotiation take places to determine which of the two devices subsequently takes the role of host.

All versions of USB define cable connections having power lines (Vbus and GND) and data lines (D+ and D−). In USB OTG, the mini-A plug, the mini-B plug, and the mini-AB receptacle add a fifth pin, called the identification pin (ID), to give different electrical identities to the cable ends. The ID pin is connected to ground inside the mini-A plug and left floating in the mini-D plug. The OTG device receiving the grounded ID pin identifies itself as the default A device (host), and the device with the floating ID pin identifies itself as the default B-device (peripheral).

Figure 2:
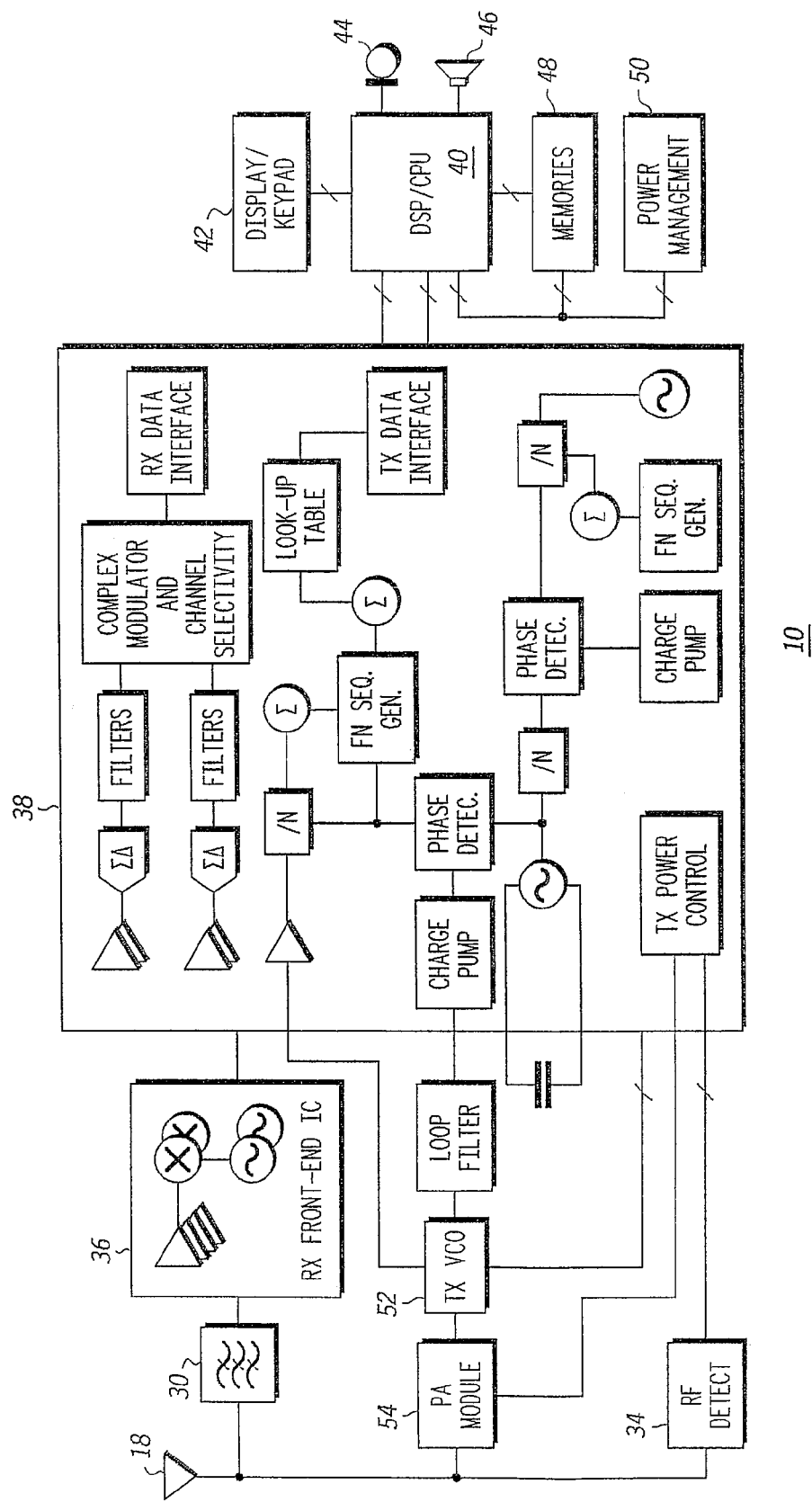
FIG. 2 illustrates a more detailed block diagram of exemplary wireless mobile communication device, in accordance with a preferred embodiment of the present invention.

FIG. 2 illustrates a more detailed block diagram of exemplary wireless mobile communication device 10, in accordance with a preferred embodiment of the present invention. In this embodiment, the wireless mobile communication device 10 may be, for example, a cellular handset, a wireless-enabled laptop computer, a one or two-way pager, or some other wireless communication device. Wireless mobile communication device 10 generally comprises antenna 18 coupled to a filter 30 and a radio frequency (RF) detector 34. Filter 30 is coupled to receiver (Rx) front-end block 36 having an output coupled to a synthesizer and transmitter/receiver (Tx/Rx) back-end block 38 coupled to a digital signal processor/central processing unit (DSP/CPU) 40. The synthesizer and Tx/Rx block 38 is also coupled to a transmitter block (TX VCO) 52 having a power amplifier (PA) module 54 coupled to antenna 18 for transmitting RF transmissions. DSP/CPU 40 has memories 48 associated therewith, for example read-only memory (ROM) and read/write random access memory (RAM). Various input and output devices are coupled to the CPU, including a display and keypad referenced with a common identifier 42, a microphone 44 and speaker 46. The exemplary embodiment also includes a power management module 50. The receiver front-end block 36 and synthesizer and transmitter/receiver back-end block 38 are preferably integrated circuits (ICs), although other embodiments may be implemented.

Figure 3:
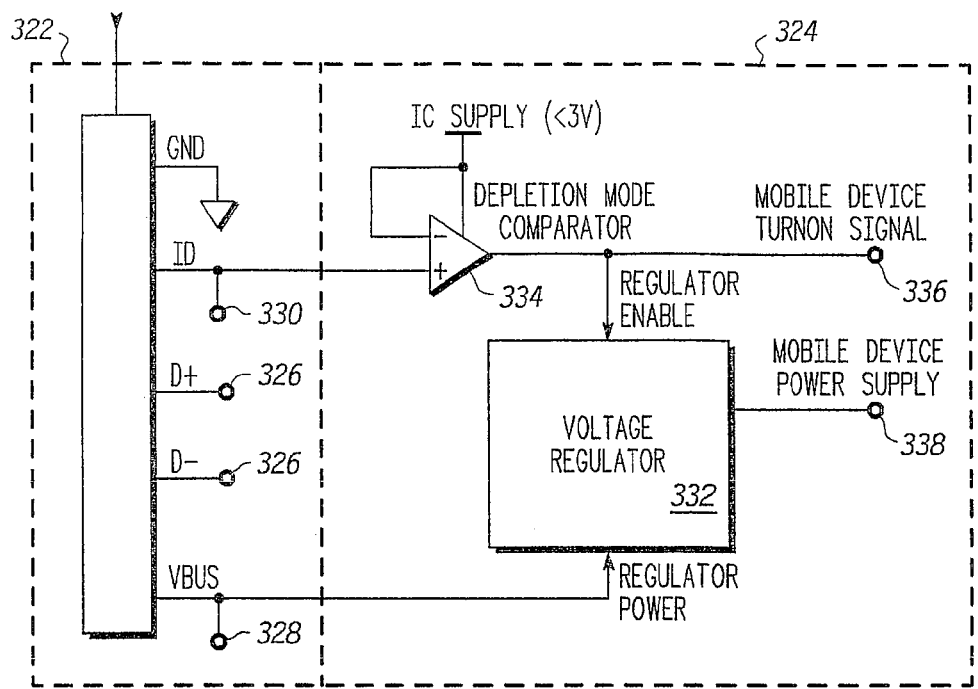
FIG. 3 shows a block diagram of a connector interface for a wireless mobile communication device, in accordance with a preferred embodiment of the present invention.

With reference now to FIG. 3, there is shown a block diagram of a connector interface for a wireless mobile communication device, in accordance with a preferred embodiment of the present invention. Connector interface 22 (FIG. 1) contains a receptacle 322 coupled to a turn-on circuit 324. Receptacle 322 is configured for receiving a serial cable to provide serial bus communications in accordance with a serial bus protocol. In preferred embodiments, receptacle 322 is a mini-B plug or a mini-AB receptacle providing a USB OTG interface for mobile wireless communications device 10. In the preferred embodiment shown at FIG. 3, receptacle 322 is a mini-AB receptacle that receives data from a compatible cable on data lines (D+ and D−) and forwards the data to controller 12 at nodes 326. USB mini-AB receptacle 322 also has power lines (GND and Vbus) that provide ground and voltage (node 28), respectively, to wireless communications device 10. One significant advantage to USB is its ability to power a portable electronic instrument such as a mobile phone using the power lines in the USB cable. In normal USB OTG operation, USB mini-AB receptacle 322 receives an ID signal from a USB mini-A or mini-B plug (not shown) connected to the mini-AB receptacle 322 thereby indicating to controller 12 via node 330 whether the wireless mobile communication device 10 is a host or peripheral.

In accordance with the present invention, specialized serial cable 28 is connected to receptacle 322 to connect the wireless mobile communication device 10 with factory system 26 during manufacturing or distribution, when it may be advantageous to place the mobile device in a special operating mode such as, for example, to load or update software or perform specialized testing or diagnostics, for example. Cable 28 is generally configured to be compatible with the mini-AB receptacle in form, fit and operation, including the five-pin configuration providing data (D+ and D−), power (GND and Vbus) and ID. Cable 28 applies power on the Vbus pin at 5 Volts, thereby providing IC power supply to the integrated circuits in wireless communication device 10, including voltage regulator 332 and depletion mode comparator 334. Voltage regulator 332 receives regulator power directly from Vbus, while depletion mode comparator 334 receives a special IC power supply regulated directly off Vbus (connection not shown) at less than 3 Volts (IC SUPPLY).

As explained above, USB OTG requires the USB cable connected to receptacle 322 to float (i.e. open-circuit) or ground the ID pin to direct the attached device to act as peripheral or host. However, as used in a preferred embodiment, cable 28 is a non-standard OTG cable that provides a voltage signal on the ID pin, instead of grounding or floating it. This non-standard USB mode specifies that factory system 26 is placing the attached electronic device in a special predetermined mode of operation. An input voltage between 3.0V to 3.6V in a preferred embodiment is applied on the ID pin and is received at the positive terminal of depletion-mode comparator 334.

Depletion-mode comparator 334 utilizes depletion-mode, p-type Field Effect Transistors (P-FETs) to allow comparison of input voltages that exceed the supply voltage to the integrated circuits (i.e. are >3V). It has been discovered that use of use of such a depletion mode comparator has significant advantages. First, depletion mode comparator 334 is configured to detect a voltage on the USB ID pin that exceeds the on-chip power supply. Second, use of a depletion mode comparator permits operation of turn-on circuit 324 without placing a DC load on the ID pin or otherwise creating interference to normal USB operations on connector interface 22. Other types of comparators such as enhancement-mode or n-type may also be utilized in a proper configuration for those devices. It has been further discovered that hysteresis of the trigger point for depletion-mode comparator 334 is preferably adjusted to provide a voltage trip range from 3.0 volts to 3.6 volts when the comparator is powered from an approximately 2.775V supply. Other voltage trip ranges may also be utilized in proper configurations.

Upon receiving a voltage within the trip range, a positive signal is generated at the output of depletion-mode comparator 334. This signal generates both a mobile device turn-on signal on pin 336, and a REGULATOR ENABLE signal on an enable pin for voltage regulator 332. The automated mobile device turn-on signal initiates a turn-on or power-on process to start operation of the device. The automated mobile device turn-on signal further flags the mobile phone's software executing within controller 12 that the phone should be placed in a special loading mode for receiving software. The REGULATOR ENABLE signal on voltage regulator 332 enables a regulated voltage of 2.775 volts to be generated at the output of voltage regulator 332 on the mobile device power supply pin 338 to generally supply power to the device.

As will now be appreciated, even if wireless mobile communication device 10 is battery-less, activation of the wireless device in this special mode of operation by factory system 26 provides power supply to the wireless device at pin 338, and further provides an automatic power-on signal at pin 336. Wireless mobile communication device 10 responds to this automated turn-on signal by powering controller 12, ASIC 20 and auxiliary systems 14 in a unique production mode of operation for downloaded software to controller 12 and/or memory devices 13. Factory system 26 then downloads software 24 over cable 28 to controller 12 to be executed and/or stored. As can be seen, by placing a unique voltage on the ID pin of the USB connector interface, turn-on circuit 324 is able to supply power to the battery-less electronic mobile device, and place the device in a particular state of operation, for example a test or software load mode. Because the mobile device is automatically turned on and placed in this special mode, the efficiency of software loading or testing during production or distribution of the mobile device is improved.

Figure 4:
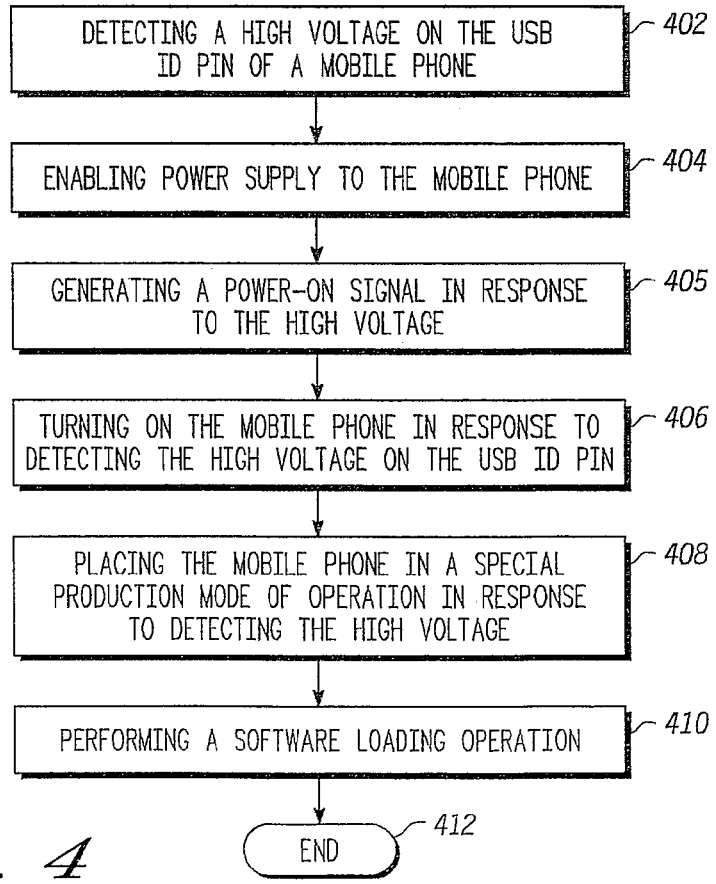
FIG. 4 shows a flow diagram of a process for powering a battery-less mobile device and automatically placing it in a special mode of operation, in accordance with a preferred embodiment of the present invention.

With reference now to FIG. 4, there is shown a flow diagram of a process for powering a battery-less mobile device and automatically placing it in a special mode of operation, in accordance with a preferred embodiment of the present invention. The process begins at step 402 when a turn-on circuit in the device detects a high voltage in excess of the integrated power supply voltage on the USB ID pin of the USB mini-AB receptacle of the mobile device. This detection triggers a signal indicating the mobile device has been connected to a special PC or factory system for production software loading or testing. At step 404, the turn-on circuit enables the regulated power supply from the Vbus pin of the USB mini-AB receptacle to automatically power the mobile device. At step 406, the turn-on circuit generates a power-on signal that causes the mobile phone to turn-on and begin operation. At step 408, the mobile phone places itself in a special mode of operation in response to the power-on signal from the turn-on circuit. At step 410, the mobile phone receives the software loading operation and any further required testing or diagnostics is performed. Thereafter, the process ends at step 412.

In one aspect of the invention, a battery-powered portable electronic device includes a serial bus interface for providing serial communications to the electronic device via a connected serial cable having an information pin and a power pin. The device further includes a turn-on circuit electrically coupled to the information pin and a power pin of the serial bus interface, wherein, in response to a non-standard signal received on the information pin, the turn-on circuit: (1) generates a mode signal for the electronic device, and (2) enables power to be supplied to the electronic device from the power pin.

In another aspect of the invention, a circuit includes a comparator receiving a reference voltage at a first input of the comparator and an identification signal from a serial bus interface at a second input of the comparator, and generating a comparison signal on an output of the comparator when the identification signal is non-standard as indicated by a comparison to the reference voltage, wherein the output of the comparator is coupled to an electronic device that enters a unique mode of operation in response to receiving the comparison signal. The circuit also includes a voltage regulator receiving a power signal from the serial bus interface at a first input of the voltage regulator and being electrically coupled to the output of the comparator at a second input of the voltage regulator, wherein the voltage regulator is enabled to generate a power supply on an output of the voltage regulator in response to the comparison signal.

In yet another aspect of the invention, a method for powering and placing a battery-powered electronic device in a specialized mode of operation includes detecting a unique voltage condition on an information pin of a serial bus interface to the electronic device, automatically enabling power supply to power the electronic device in response to detecting the unique voltage condition, and automatically placing the electronic device in a special mode of operation in response to detecting the unique voltage condition.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A battery-powered portable electronic device comprising:
    a serial bus interface for providing serial communications to the electronic device via a connected serial cable having an information pin and a power pin;
    a turn-on circuit electrically coupled to the information pin and a power pin of the serial bus interface, wherein, in response to a non-standard signal received on the information pin, the turn-on circuit: (1) generates a mode signal for the electronic device, and (2) enables power to be supplied to the electronic device from the power pin;

a comparator receiving a reference voltage at a first input of the comparator and an identification signal from the serial bus interface at a second input of the comparator, and generating a comparison signal on an output of the comparator when the identification signal is non-standard as indicated by a comparison to the reference voltage, wherein the output of the comparator is coupled to the electronic device that enters a unique mode of operation in response to receiving the comparison signal; and a voltage regulator receiving a power signal from the serial bus interface at a first input of the voltage regulator and being electrically coupled to the output of the comparator at a second input of the voltage regulator, wherein the voltage regulator is enabled to generate a power supply on an output of the voltage regulator in response to the comparison signal.

2. The device of claim 1, further wherein the mode signal indicates to the electronic device to enter into a special mode of operation.

3. The device of claim 2, wherein the special mode of operation enables the electronic device to load software transmitted over the serial cable.

4. The device of claim 1, wherein the serial bus interface is a USB On-The-Go connector.

5. The device of claim 1, wherein the information pin is an identification pin.

6. The device of claim 1, wherein the electronic device is capable of being battery-powered but a battery is not present and powering the electronic device when the non-standard signal is received.

7. The device of claim 1, wherein the electronic device is a wireless mobile communication device.

8. The device of claim 1, wherein the comparison signal indicates to the electronic device to automatically turn on and enter into the unique mode of operation.

9. The device of claim 1, wherein the unique mode of operation indicates a software download mode of operation for the electronic device.

10. The device of claim 1, wherein the unique mode of operation indicates a testing mode of operation for the electronic device.

11. The device of claim 1, wherein the comparison signal generates an interrupt within the electronic device to begin software loading via the serial bus interface.

12. The device of claim 1, wherein the comparator is a depletion mode comparator.

13. The device of claim 1, wherein the electronic device is capable of being battery-powered but a battery is not present and powering the electronic device when entering the unique mode of operation.

* * * * *